Sept. 20, 1971  J. G. SATTERTHWAITE ET AL  3,606,505

MARINE BEARING

Filed July 17, 1967

INVENTORS
JAMES GLENN SATTERTHWAITE
& JAMES B. MACY JR.
BY
McNENNY, FARRINGTON, PEARNE, & GORDON

ATTORNEYS

INVENTORS
JAMES GLENN SATTERTHWAITE,
& JAMES B. MACY JR.
BY
McNENNY, FARRINGTON,
PEARNE & GORDON

ATTORNEYS

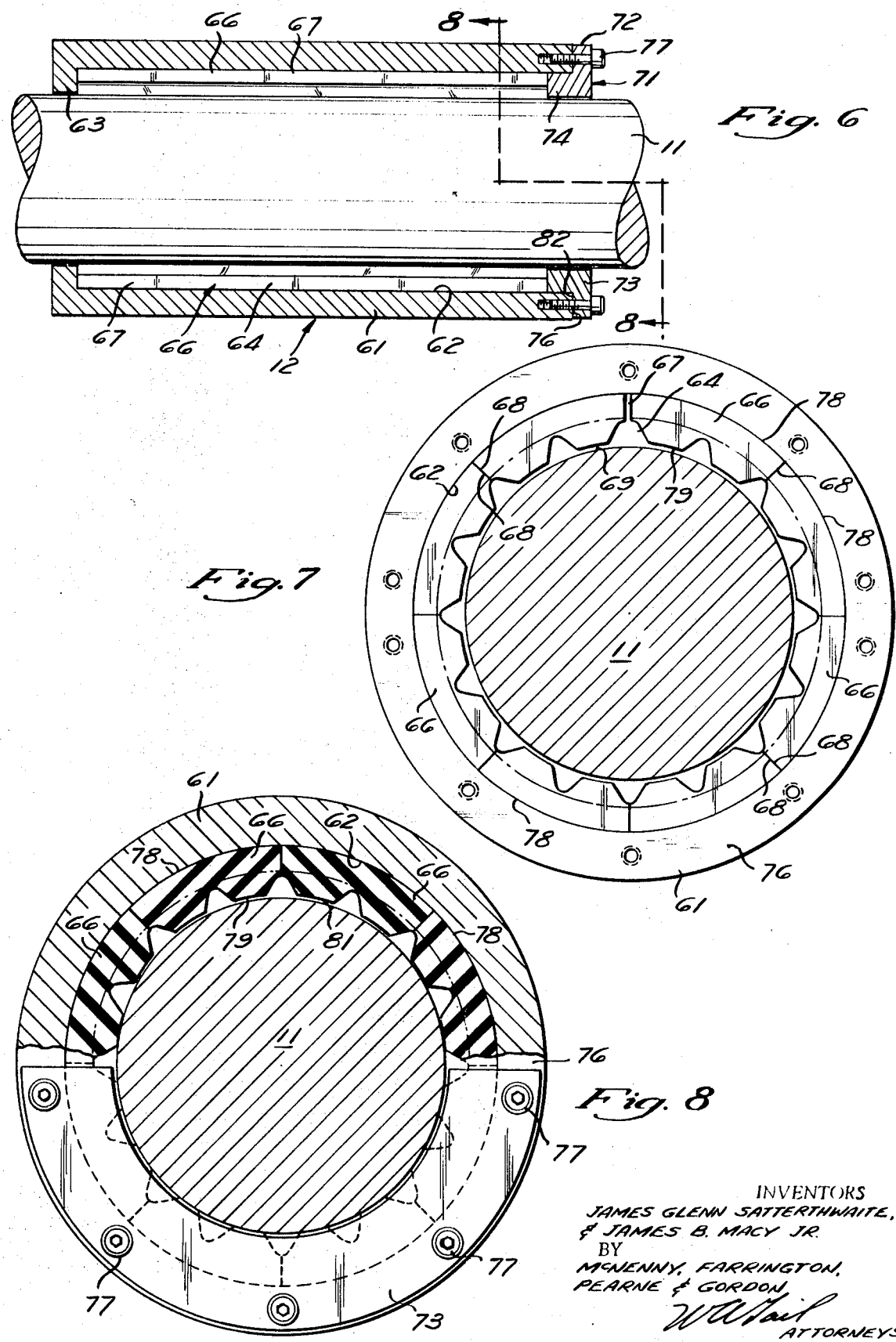

3,606,505
MARINE BEARING

James Glenn Satterthwaite, 1 Dogwood Trail, Chesapeake, Va. 23320, and James B. Macy, Jr., 107 Holly Lane, Morehead City, N.C. 28557
Continuation-in-part of application Ser. No. 515,395, Dec. 21, 1965, now Patent No. 3,407,779, dated Oct. 29, 1968. This application July 17, 1967, Ser. No. 653,796
Int. Cl. F16c 27/00
U.S. Cl. 308—238    16 Claims

ABSTRACT OF THE DISCLOSURE

A marine bearing provided with a plurality of staves formed entirely of elastomeric material. The staves are assembled in a housing with clearance and are then subjected to releasable compressive stress to produce locking pressure between the exterior of each stave and the interior of the housing. The compressive stress may be applied radially or axially. The stave may be formed of concentric layers of different hardness or compounding. Close tolerances and small clearances may be provided because the bearing may be assembled and disassembled in place around the shaft. Critical resonant vibration within the normal shaft speed operating range is minimized or eliminated by properly selecting the amount of clearance, the amount of prestressing, the relative composition, and the relative hardness of the elastomeric material.

---

This invention is continuation-in-part of our copending application Ser. No. 515,395, filed Dec. 21, 1965 now Pat. No. 3,407,779 issued Oct. 29, 1968.

BACKGROUND OF INVENTION

The present invention relates generally to water lubricated marine bearings formed of elastomeric material and more particularly, to a novel and improved propeller shafting bearing constructed and arranged to permit assembly or disassembly of the bearing in place around the propeller shaft. Previous general practice has required the removal of the shaft from the bearing by endwise movement of the shaft or by endwise movement of the bearing until the members disassemble. Further, the structure is arranged so that problems of resonant vibration are minimized or eliminated.

SUMMARY OF INVENTION

A novel and improved bearing assembly incorporating this invention combines a housing assembly and a plurality of accurately positioned segmental bearing elements referred to hereinafter as "staves" which cooperate to provide a bearing surface formed of elastomeric material surounding the propeller shafting. In the illustrated embodiments the elastomeric material is placed under compressive stress in manners discussed below. It is recognized that most elastomeric materials are incompressible and that the compressive stress does not appreciably reduce the volume of the material. Therefore, the use herein of the terms compression, compressed or the like, is intended to refer to the stressing of the material causing it to deform rather than to compress to reduce volume.

The housing assembly includes clamping means to radially press and lock the staves in the desired installed position. The mating surfaces of the stave assembly and housing assembly are cylindrical, so release of the clamping pressure permits both axial and circumferential movement of the staves for repair and servicing. With this structure it is not necessary to provide irregular shapes, tongues and grooves, or lock screws to secure the staves in the assembled position.

Stop means cooperate with the clamping means to insure that the inner bearing surface of each stave is precisely positioned with respect to the inner bearing surfaces of the other staves of the assembly, and with respect to the propeller shafting.

In addition, the staves are constructed and mounted so that the problems of resonant vibration normally encountered in systems of this type are eliminated or minimized. In the past it has been customary to test a ship under various operating conditions and determine the operating shaft speeds at which resonant vibration occurred. Thereafter, insofar as possible the ship was not operated in these shaft speed ranges. However, with the present invention it has been found that resonant vibration can, in most instances, be completely eliminated so restrictions of operating shaft speeds need not be observed.

In the illustrated embodiments of this invention, the entire stave is formed of elastomeric material with the inner bearing surface of the staves formed by soft elastomeric material, preferably rubber. Longitudinally extending grooves conduct water into the bearing to provide water lubrication of the bearing surfaces. In the illustrated embodiments these grooves are longitudinal, but other types of grooves, such as helical grooves, may be used if desired.

The proportions of the staves and housing assembly are such that the clamping means provide tight engagement between the outer surfaces of the staves and the housing to lock the staves in position and to prestress the elastomeric material. The housing assembly is provided with stop means to precisely limit the degree of deformation of the staves so that the inner bearing surface of each stave is precisely located with respect to the inner bearing surface of the other staves.

The inner bearing surface of each stave is initially shaped to closely fit the exterior surface of the propeller shafting. With such a structure, substantial deflection of the elastomeric material due to the shaft and propeller end load is not required to produce substantial bearing contact area to properly seat the shaft journal and the unit pressure on the bearing surface is substantially minimized in any given bearing zone.

It is possible to size the elements for minimum clearances after the shaft load is applied and to use co-mating cylindrical surfaces between the inner bearing and journal surfaces, because the bearing assembly incorporating this invention may be assembled in place around the shaft, and because the inner bearing surfaces of the staves are accurately positioned during the assembly. If the installation of the bearing must occur as a unit over the end of the shaft, or be pressed tightly into a solid housing, greater clearance must be provided because surface friction occurs between the shafting and bearing surfaces. For a given installation, incorporating this invention increased bearing area is provided and the unit pressure on the bearing surfaces is substantially minimized throughout the full length of bearing. Further, the provision of reductions in the amount of clearances after the load is applied substantially reduces vibration and improves lubrication due to increased film load carrying capacity while improving service life by minimizing unequal propeller thrust impulses. Still further, the prestressing of the stave material and the use of a multidurometer construction has been found to eliminate ranges of critical resonant vibrations of the propeller system normally encountered in most ships.

It is an important object of this invention to provide a novel and improved marine bearing assembly including a housing assembly and a plurality of bearing staves removably positioned in a housing assembly wherein the staves cooperate to define a smoothly curved outer surface mating with a similar surface on the housing assembly, and the housing assembly is provided with clamping means to provide radial pressure between the staves and housing to lock the staves in the assembled position. Stop means are provided to limit the clamping action and to accurately position the bearing surface of each stave with respect to the bearing surface of the other staves.

It is still another object of this invention to provide a novel and improved marine bearing assembly combining a plurality of removable staves formed entirely of an elastomeric or rubberlike material and a housing assembly operable to compress the staves to a predetermined stressed condition and to lock them in assembled position.

It is still another object of this invention to provide a novel and improved marine bearing assembly according to either of the preceding objects wherein the staves are formed in layers of elastomeric material of varying compounds and or hardnesses designed so that the natural frequency of the bearing complement occurs outside the range of vibratory cycles encountered within the normal operational speed range of the shafting and propeller system, thus eliminating vibratory resonances within a specific system.

Further objects and advantages will appear from the following description and drawings wherein:

FIG. 6 is a side elevation in longitudinal section of another embodiment wherein the staves are compressed axially to prestress the staves and lock them in position;

FIG. 7 is an enlarged end view of the embodiment of FIG. 6 illustrating the staves before they are axially compressed; and, FIG. 8 is an end view similar to FIG. 7 illustrating the staves in the compressed position.

A bearing incorporating this invention may be mounted inboard of the vessel hull, along the shafting at the point where the shafting emerges from the hull, or outboard of the hull. The inboard bearings which may or may not be submerged are provided with a suitable lubrication means which supply water, oil or other lubricant to the bearing surfaces. If the bearing is oil lubricated the elastomeric material must be substantially impervious to hydrocarbon deterioration. An example of such material is a nitrile rubber composition. The outboard bearings are submerged and are preferably open water lubricated, although they may be designed as sealed systems.

Figure 1:
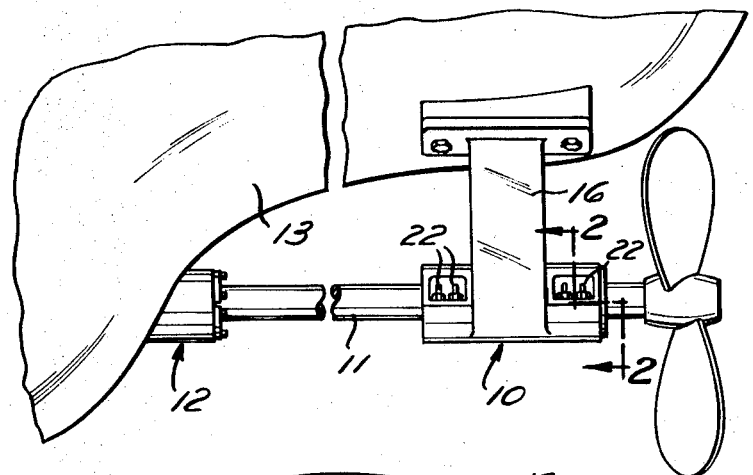
FIG. 1 is a fragmentary side elevation of a vessel with marine bearings incorporating two embodiments of this invention mounted to support the propeller shaft of the vessel.

FIG. 1 illustrates a typical installation of both types of bearing. The bearing assembly 10 adjacent to the outboard end of the propeller shaft 11 is an example of one embodiment and the bearing assembly 12 at the stern tube is an example of another embodiment. The shaft 11 extends out through a stern tube bearing assembly 12, from the interior of the hull 13, through the outboard bearing 10, and supports a propeller 14 at its end.

The bearing assembly 10 is provided with a pair of struts 16 which are bolted, welded, or otherwise suitably fastened to the hull structure 13 to support the bearing assembly 10. It should be understood that during the operation of the vessel, both bearing assemblies are normally submerged.

Figure 2:
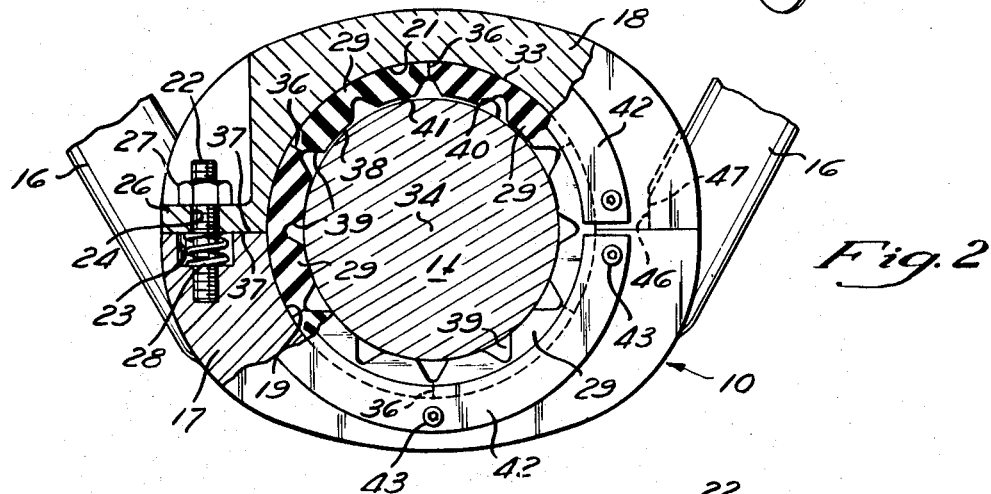
FIG. 2 is an enlarged, fragmentary cross section taken generally along 2—2 of FIG. 1.
Figure 3:
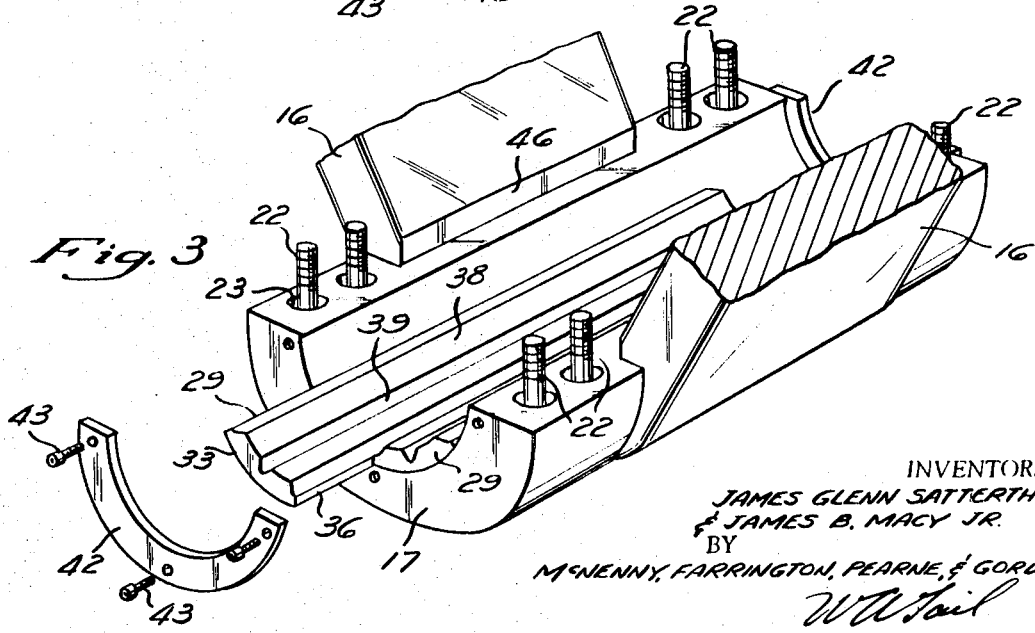
FIG. 3 is an exploded, perspective view of the bearing illustrated in FIG. 2, with the top housing member removed and illustrating one stave in a partially removed position.

Referring now to FIGS. 2 and 3, the bearing assembly 10 includes a housing assembly consisting of a lower housing member 17 and an upper housing member 18. The struts 16 are integrally formed on the lower housing member 17. The two housing members 17 and 18 are formed with longitudinally extending clamping surfaces 19 and 21 respectively. These surfaces are proportioned so that they cooperate to define a cylindrical inner surface when the upper clamping member 18 is assembled on the lower housing member 17, as illustrated in FIG. 2.

A plurality of stud bolts 22 are threaded into the lower housing member 17 and project up through associated counterbores 23 and through bolt holes 24 formed in a flange section 26 in the upper housing member 18. Nuts 27 are threaded onto each of the stud bolts 22 and engage the upper face of the flange 26 to press the upper housing member 18 downwardly toward the lower housing member 17. Springs 28 are positioned in the counterbore 23 around the stud bolts 22 to resiliently urge the upper housing assembly in an upward direction and to lift the upper housing member 18 away from the lower housing member 17 when the nuts 27 are loosened.

Positioned within the two housing members 17 and 18 around the propeller shaft 11 are a plurality of similar bearing staves 29, each extending 60 degrees around the shaft 11. However, bearings may be provided with a greater or lesser number of staves so long as they are proportioned to properly encircle the shaft.

In the illustrated embodiment, the staves 29 are formed of elastomeric material, preferably relatively soft rubber. The outer surfaces 33 are proportioned so that the staves 29 cooperate to provide a cylindrical outer surface mating with and engaging the clamping surfaces 19 and 21 of the housing members 17 and 18. When the bearing is assembled, the clamping surfaces 19 and 21 and the collective outer surfaces 33 define surfaces of revolution about a central bearing axis 34.

The longitudinal edges 36 of the staves 29 are radial with respect to the axis 34 and contained in a plane containing the axis 34. Each of the longitudinal edges 36 of each of the staves 29 engages an adjacent longitudinal edge of an adjacent stave 29.

The unstressed size of the staves 29 is proportioned so that they are in engagement along their edges 36 before the opposed surfaces 37 on the housing members 17 and 18 engage. Therefore, the continued tightening of the nuts 27 until the surfaces 37 engages causes compression of the staves 29 and radial locking pressure between the staves and housing. The amount of oversizing of the staves determines the amount of radial gripping for a given stave material. The elastic modulus of the material used to form the staves should be taken into consideration when establishing the dimensions of the parts.

The staves 29 are formed with inner bearing surfaces 38 which are also surfaces of revolution about the axis 34 when the bearing is assembled. The staves are also formed with longitudinal or helical grooves 39 symmetrically positioned around the shaft 11. These grooves are open at their ends and provide a copious supply of lubricate to the journal and bearing surfaces 38. When the bearings aer outboard and submerged, water flows along the grooves to supply lubricate to the journal and bearing surfaces. The inner bearing surfaces 38 are shaped so that when the staves are assembled they define an interrupted cylindrical surface around the axis 34 providing a slight clearance with the outer surface 40 of the shaft 11. The weight of the shaft 11 causes the engagement of the outer surface 40 to occur along the lower half of the bearing and the clearance 41 appears adjacent to the upper side of the shaft. The bearing surfaces 38 of the staves are initially cylindrically shaped to closely match and comate with the curvature of the outer surface 40 of the shaft 11. Therefore, substantially no deflection is required in the bearing material to properly seat the shaft journal and produce a relatively large area of surface contact. Therefore, the unit pressure of engagement between the shaft and bearing surface is substantially minimized for any given zone. Consequently, bearing material and shaft journal wear is minimized and close tolerances can be maintained. Also precision tolerances can be maintained through frequent bearing renewal due to ease of replacement and relatively low cost of bearing complement. This is all possible because the bearing need not be assembled as a unit over the end of the shaft and because the structure is arranged to accurately position the inner bearing surfaces 38 of the various staves.

It is not necessary to provide separate locking means to resist the torsional load tending to rotate the bearing staves, since the clamping force produced by the tightening of the nuts 27 produces a radial pressure between the outer surface 33 of the staves 29 and the clamping surfaces 19 and 21. The fact that the inner bearing surfaces are lubricated results in a lower coefficient of friction at the inner bearing surfaces than the non-lubricated exterior stave surfaces so that the friction torque resisting turning of the staves always exceeds the friction torque between the shaft and inner bearing surfaces. Because the clamping occurs along a smooth cylindrical surface, proper positioning of the staves is achieved without difficulties which occur when dovetails or other interengaging projections are provided between the staves and housing.

A removable end plate 42 is secured by bolts 43 to each end of the housing members 17 and 18. These end plates 42 cooperate to insure proper axial location of the bearing staves within the housing assemblies. The various proportions are arranged so that the plates 42 grip the ends of the staves.

The disassembly and reassembly of the bearing is preferably accomplished as follows. The nuts 27 are loosened, allowing the upper housing member 18 to be moved upwardly by the springs 28. This releases the radial clamping pressure on the staves. The propeller shft 11 is then lifted by any suitable means, such as a chain hoist, from the hull 13 or, if the vessel is in drydock, by any suitable jacking means, so that weight of the shaft 11 is lifted off the bearing. Preferably, the shaft is raised until clearance is present around the entire shaft surface 40. The end plates 42, at least at one end, are then removed and the bearing staves 29 are free to be moved axially out of the housing, as illustrated in FIG. 3. If desired, the end plates at both ends may be removed so that the staves can be pushed out of the housing.

After removal of the worn staves, new staves may be positioned in the bearing by sliding them along the housing into the assembled position. In many instances, the lower staves 29 will be replaced because they wear more rapidly than upper staves. In such instances, the upper staves may be moved circumferentially around the shaft to the lower position. New staves are then inserted in the upper position. Because a smooth cylindrical surface is provided between the staves and housing, it is easy to move the staves either axially or circumferentially around the bearing.

After the staves are properly positioned, the end plates 42 are replaced and the nuts 27 are again tightened to the required torque to complete the reassembly. The shaft 11 is then released and the repair or servicing operation is completed.

Interengaging vertical surfaces 46 and 47 on the housing members 17 and 18, respectively, insure accurate lateral positioning of the upper housing member 18 with respect to the lower housing member 17. However, if desired, these guide surfaces need not be used if the staves are installed, so that a stave 29 extends across the joint between the two housing members as illustrated in FIGS. 2 and 3. The housing members and clamping structure are preferably formed of a corrosion-resistant metal, such as bronze or the like, however, steel is used in large installations.

Figure 4:
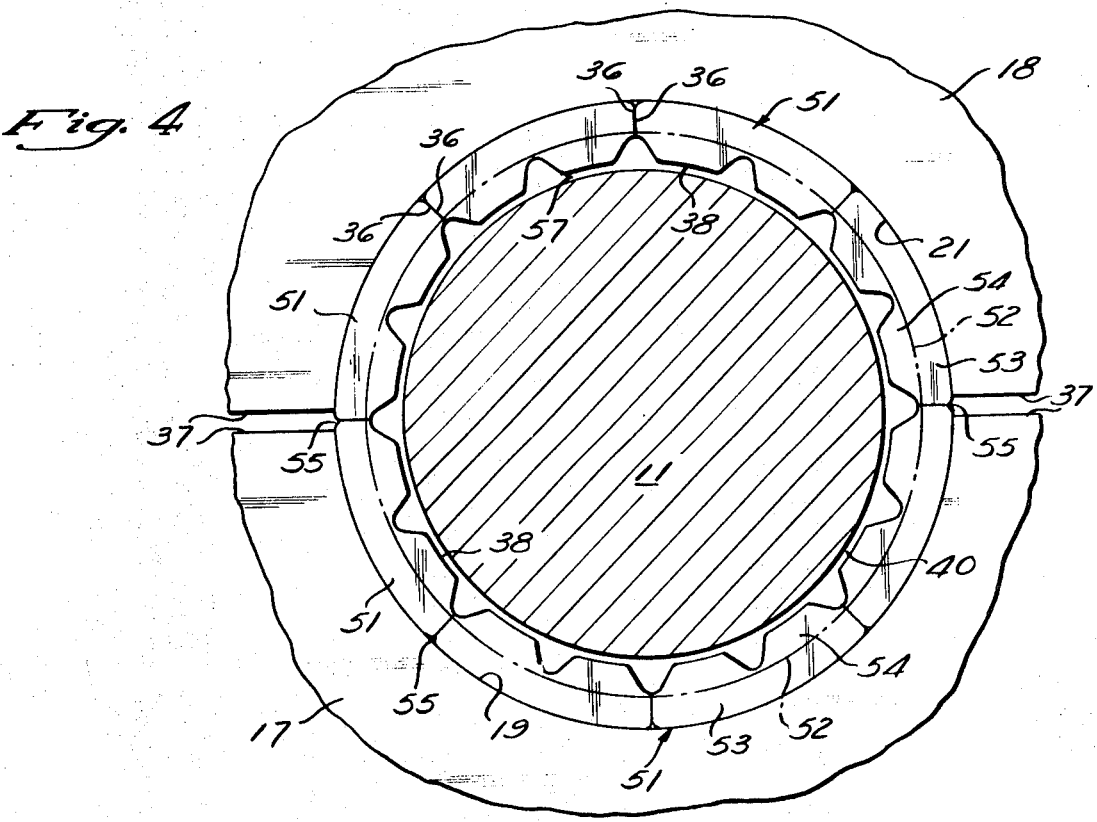
FIG. 4 is an enlarged fragmentary end view of a second embodiment similar to the bearing illustrated in FIG. 2 before the staves are compressed.
Figure 5:
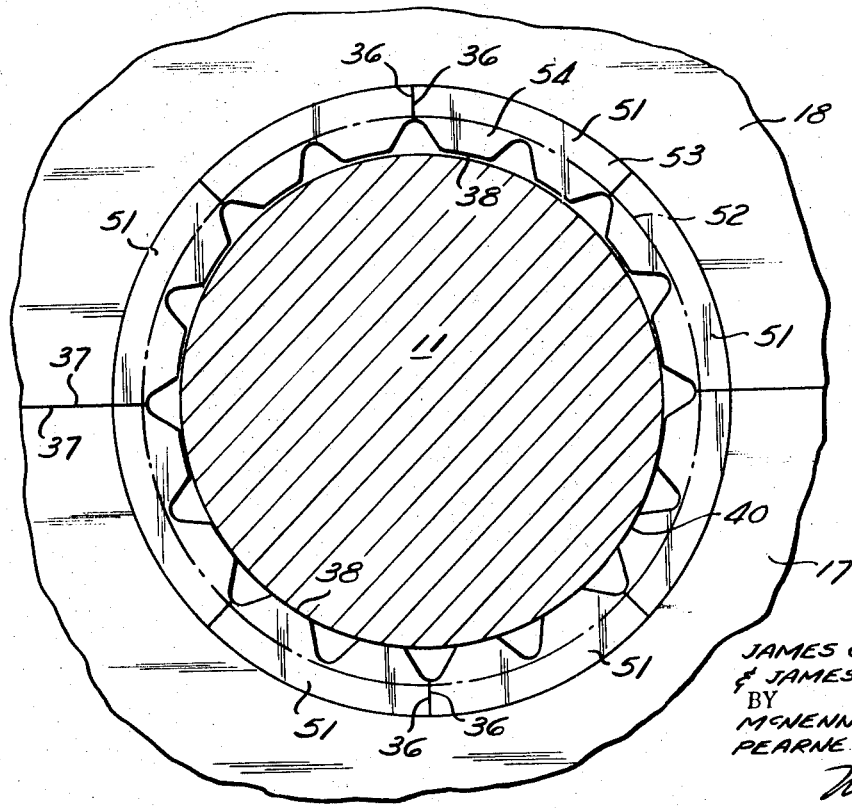
FIG. 5 is a fragmentary end view similar to FIG. 4 showing the elements after compression of the staves.

FIGS. 4 and 5 illustrate an embodiment of this invention wherein the staves 51 are again formed entirely of an elastomeric material and are subjected to radially inward compressive forces by the housing assembly. In this embodiment the staves 51 are formed with two layers of elastomeric material moulded together along their interface 52. The outer layer 53 is formed of relatively hard rubber having a durometer of about eighty five on Shore C Scale and the inner layer 54 is softer, having a durometer af about eighty on the Shore A Scale. Staves of this type are preferably formed by placing one type of rubber in a mold in the uncured state and then injecting a subsequent layer into the mold under pressure. Both layers are then cured at the same time while the rubber is under pressure. With this procedure the stave is formed of a homogenous mass of rubber consisting of layers of different composition and or hardness. With this structure the locking forces between the staves and housing is greater for a given amount of compression. It should be understood that more than two layers can be used if desired. Here again, the lower housing member 17 and the upper housing member 18 are proportioned so that opposed faces 37 on the housing members 17 and 18, are clamped into engagement as illustrated in FIG. 5 by the clamping means. The clamping means may be of the same type as illustrated in FIG. 2. Interengagement between the opposing stop faces 37 limits the compressive force applied to the staves 51 when the inner bearing surfaces 38 are properly positioned with respect to each other and to the shaft 11, and the desired amount of prestressing of the staves is achieved.

The staves 51 illustrated in FIGS. 4 and 5 extend around the shaft for 45 degrees in the assembled condition and are sized in their unstressed condition as illustrated in FIG. 4. When the longitudinal edges 36 abut, a clearance 56 is provided between the faces 37, and a substantial amount of clearance 57 is provided between the shaft 11 and each of the inner bearing surfaces 38.

The radially inward contraction produced during the clamping again reduces the clearance between the bearing surfaces 38 and the exterior of the shaft 11 to the desired degree. Since the material forming the staves 51 is prestressed and closely fits the shaft, shaft deflections under load are reduced and vibration is minimized.

In order to prevent pinching of the stave material between surfaces 37 during the clamping operations, a relief 55 may be provided on each stave at the junction of the exterior surface and the longitudinal edges. During compression, the material of the staves flows into this relief and full contact is provided as illustrated in FIG. 5.

In one installation of a bearing of the type illustrated in FIGS. 4 and 5 eight staves 51 were employed to provide the bearing assembly for an eight inch propeller shaft having a bearing sleeve mounted thereon so that the shaft had an effective diameter of nine inches within the bearing. Each of the staves was formed with two layers having a hardness relationship as mentioned above. The peripheral length on each stave was about sixty thousandths of an inch oversize so that the peripheral length of the outer surfaces of the assembled staves when unstressed was about four hundred and eighty thousandths of an inch larger that the corresponding dimension after the staves were compressed in the housing. The staves when unstressed had a total thickness of about one and five sixteenths inches with the inner soft layer about three eighths of an inch thick. After being compressed by the housing the staves increased in thickness about twenty five thousandths of an inch. The bearing was about thirty five inches long and the propeller was a four blade propeller weighing about thirty six hundred pounds. The force necessary to compress the bearing staves was about six tons.

In another installation six staves about twenty seven inches long were installed in a bearing having a journal diameter of seven inches. These staves were again formed of two layers having a hardness as mentioned above. The total unstressed thickness of each stave was about one and one sixteenth of an inch and soft inner layer was about five sixteenths of an inch thick. The normal speed range of the shaft was between about ninety and two hundred and thirty revolutions per minute. The propeller was a four bladed, sixty eight inch diameter propeller weighing about fifteen hundred pounds.

In the past, propeller and bearing systems have been found to have a critical resonant vibration frequency at some shaft speed within the normal range of operating speeds of the system. It has been customary in the past to operate the ship under test conditions to determine the critical shaft speed range in which resonant vibration occurs and to thereafter operate the ship insofar as possible at propeller speeds outside of this critical speed range. In these installations described above tests were conducted to determine if a critical shaft speed range was present. It was found that the system did not have a critical speed in which resonant vibration occurred. The normal maximum speed of propeller rotation for the ship first mentioned above is about 225 r.p.m. However, when the ship was tested to propeller speeds as high as about 250 r.p.m. no resonant vibration occurred.

It is believed that the provision of compressive prestress, the provision of relatively close tolerances, and use of dual durometer staves all cooperated in the installations described above to eliminate the problem of critical resonant vibration. Generally the natural resonant frequency of a piece of elastomeric material is increased when its hardness is increased or its thickness is decreased. Also the application of compressive stress tends to cause elastomeric material to exhibit a higher natural resonant frequency. In other words, the compressive prestressing tends to cause a given elastomeric material to act like a harder material, at least insofar as resonant frequencies are concerned. Still further, the construction employing two or more layers of material of different composition and or hardnesses tends not only to increase the natural frequency of the body but also tends to substantially increase the effective damping so that it is often difficult to produce a clear resonance.

In most instances changes in the compounding of the elastomeric material can, for a given hardness, change the natural resonant frequency and the damping characteristics.

Bearings incorporating this invention can, therefore, normally be designed to eliminate the problems of vibration amplitude and critical resonance by arranging the structure so that the damping minimizes vibratory amplitude and so that the natural resonant frequency of the body is outside the frequency of vibration impulses or cycles encountered in normal operation.

FIGS. 6 through 8 illustrate the structural detail of the bearing assembly 12. This embodiment is particularly desirable for supporting the shaft at the stern tube where the shaft emerges from the hull 13 since the bearing can be assembled and disassembled at its end, and may also be designed with struts attached similar to FIGS. 2 and 3. In this embodiment the housing may be a solid tubular member 61 positioned around the propeller shaft 11. The housing provides a cylindrical inner surface 62 extending from is outer end to an inwardly extending flange 63 at the inner end of the bearing. The cylindrical surface 62 cooperates with the shaft 11 to define an annular space 64 in which the staves 66 are positioned.

The staves 60 are proportioned so that when they are unstressed they can slide into the housing 61 without interference as illustrated in FIG. 7. In fact, it is preferable to proportion the staves so that there is a small gap 67 between the longitudinal edges 68 of at least two of the staves when the last stave is inserted. This small gap insures that all of the staves can be freely and easily positioned by axial movement into the housing 61. Also the radial thickness of the staves 66 is arranged so that a clearance 69 is provided between the stave and both the shaft 11 and the inner surface 62 of the housing .

The staves are prestressed and locked in the housing 61 by axial compression applied by a ring assembly 71 which is the removable head member. In the illustrated embodiment the ring assembly 71 includes two ring sectors 72 and 73 each of which extends around the shaft through an angle of 180° so that the two sectors cooperate to form a complete ring. Of course, the ring can be formed of more sectors if desired. When the staves 66 are unstressed and are positioned in the housing 61 with one end against the flange 63 the other end is substantially adjacent to the end 76 of the inner surface 63. The ring sectors 72 and 73 are provided with curved projections 74 which are adapted to fit into the housing while providing clearance with the shafts 11.

Bolts 77 extend through the ring sectors and are threaded into the housing 61 so that tightening of the bolts causes the ring sectors to move to the assembled position of FIG. 6 in which the projection 74 extends into the housing and axially shortens the staves 66. This places the staves under axial compression and causes the staves to expand laterally until the longitudinal edges 68 of each stave engage the adjacent edges of the adjacent staves. It also causes the staves to increase in thickness and produces tight radial engagement between the outer surface 78 of each stave and the inner surface 62 of the housing to lock the staves in position. Also the thickening of staves reduces the clearance 69 between the staves' inner bearing surface 79 and the outer surface of the shaft.

After the ring is installed and the staves are axially compressed the staves are tightly locked in position as illustrated in FIG. 8 and the clearance 81 is small even though the shaft 11 rests on the bottom of the bearing and all of the clearance is provided at the top of the shaft. It has been found that the stress in the staves when applied axially in this manner distributes itself along the stave so that the increase in thickness in the staves caused by the axial compression is uniform when the staves are properly dimensioned and the bearing surfaces 79 remain straight. The staves may also be dimensioned so as to produce a varying clearance longitudinally and are straight only after the shafting and propeller end load is applied. In this manner the stave complement is preloaded to compensate for unequal stave deflection due to propeller end load, therefore providing a straight shaft by true sight line through the bearing system. Projection 74 is arranged to provide the desired amount of compression of the staves when the radial face 82 engages the end face 76 to limit further compression. The staves are sized so that the projections 74 are at least at the end of the inner surface 62, when the compression is commenced to eliminate any possibility of pinching the staves.

In all of the embodiments of this invention illustrated, the staves themselves are provided with smooth outer curved surfaces which cooperate when the staves are assembled to define a surface of revolution about the bearing axis mating with the corresponding surface on the housing assembly. Therefore, the staves may be moved axially or circumferentially around the housing member as required. In addition, stop means are provided to limit the compressive movement and to insure precise location of the bearing surfaces of each of the staves when the bearing is completely assembled.

In all embodiments, the staves may be removed or moved during service, replacement and repair without removing the bearing as a unit assembly over the end of the propeller shaft 11. Therefore, it is merely necessary to provide jacking means to lift the weight of the propeller shaft off the bearing surfaces, and it is not necessary to remove the propeller shaft.

While presently preferred embodiments of the apparatus of the present invention have been described herein, with reference to the accompanying drawings, it is understood that variations, modifications, omissions, and refinements which depart from the disclosed embodiments The embodiments of the invention in which an exclusive property or privilege is claimed are defined as follows:

1. A marine bearing assembly adapted to be mounted around a vessel's propeller shafting comprising housing means adapted to be positioned around said shafting, and a plurality of segmental bearing staves formed entirely of elastomeric material and providing an inner bearing surface of elastomeric material adapted to provide bearing contact with the surface of the propeller shafting and cooperate with the bearing surface of the other of said staves to form a tubular bearing having a bearing axis, the exterior surface of said staves cooperating to define a surface of revolution around said axis engaging substantially throughout its entire extent with a mating inner surface on said housing means, said housing means including clamping means releasably producing pressure between said mating inner surface of said housing and said exterior surface of said staves and providing substantially the entire locking of said staves in said housing means, and stop means opposing said clamping means when said staves are in a predetermined position and accurately determining the position of said inner bearing surfaces of all of said staves, release of said clamping means permitting axial and circumferential movement of said staves relative to said housing assembly in place without removing said shaft.

2. A marine bearing as set forth in claim 1 wherein said staves are similar and abut along longitudinal radially extending edges.

3. A marine bearing as set forth in claim 1 wherein said surface of revolution and mating inner surfaces are cylindrical surfaces.

4. A marine bearing as set forth in claim 1 wherein said staves are proportioned so that clearance is provided around the shafting when said staves abut and said elastomeric material is unstressed, and said clamping means radially contracts the inner surface of said staves during clamping to reduce said clearance and prestress said elastomeric material.

5. A marine bearing as set forth in claim 4 wherein said clamping means compresses the exterior surface of said staves radially inward.

6. A marine bearing as set forth in claim 5 wherein said housing means includes a lower member adapted to be supported on said vessel and an upper mating member movable towards said lower member by said clamping means, said upper member being free for movement away from said lower member when said clamping means are released.

7. A marine bearing as set forth in claim 4 wherein said staves are proportioned so that when they are unstressed sufficient clearance is provided between said surface of revolution formed by their exterior surfaces and said mating inner surface of said housing to permit axial insertion and removal of said staves, and said clamping means subjects said staves to longitudinal compression aligned with the axis of the bearing, said longitudinal compression radially expanding the exterior surfaces of said staves into locking engagement with said mating inner surface of said housing.

8. A marine bearing as set forth in claim 7 wherein said clamping means includes a ring adjacent to one end of said mating inner surface of said housing, said ring being axially movable relative to said mating surface to longitudinally compress said stave.

9. A marine bearing as set forth in claim 8 wherein said ring is formed of a plurality of sectors which cooperate to form said ring.

10. A marine bearing as set forth in claim 8 wherein said staves are proportioned so that their ends are substantially adjacent to the end of said mating inner surface when said staves are unstressed, and said ring is provided with an axial projection which extends into the end of said mating inner surface when said staves are compressed.

11. A marine bearing as set forth in claim 1 wherein each stave is formed entirely of elastomeric material with the inner layer of said elastomeric material having one hardness and another layer having a hardness different than the hardness of said inner layer.

12. A marine bearing as set forth in claim 11 wherein said other layer is substantially harder than said inner layer.

13. A marine bearing as set forth in claim 1 wherein each stave is formed entirely of elastomeric material with the inner layer of said elastomeric material having one compounding and another layer having a compounding different than the compounding of said inner layer.

14. A marine bearing as set forth in claim 1 wherein said inner bearing surfaces of said staves are adapted to be deformed in varying amounts along their length by the load of the propeller shafting so that they cooperate to define an interrupted cylindrical bearing coaxial with the true sight line axis of said shafting and bearing system.

15. A marine bearing as set forth in claim 1 wherein said elastomeric material is substantially impervious to hydrocarbon deterioration, and said bearing is lubricated with a hydrocarbon lubricant.

16. A marine bearing as set forth in claim 1 wherein said inner bearing surface of said staves is concave with a radius of curvature substantially equal to the corresponding portion of the shaft when said shaft is out of contact with said bearing surface.

References Cited

UNITED STATES PATENTS

| | | | |
|---|---|---|---|
| 1,885,339 | 11/1932 | Evans | 308—238 |
| 1,919,375 | 7/1933 | Maclachlan et al. | 308—238 |
| 2,258,420 | 10/1941 | Piron | 308—238 |
| 2,393,017 | 1/1946 | Boyd et al. | 308—238 |
| 3,236,570 | 2/1966 | Satterthwaite | 308—74 |
| 3,167,361 | 1/1965 | Snapp et al. | 308—238 |
| 3,362,765 | 1/1968 | Pierce | 308—238 |
| 3,407,779 | 10/1968 | Satterthwaite et al. | 308—238X |

CARROLL B. DORITY, JR., Primary Examiner

U.S. Cl. X.R.

308—74